United States Patent [19]

Hair

[11] Patent Number: 5,330,225
[45] Date of Patent: Jul. 19, 1994

[54] PASSIVE VEHICLE SUSPENSION SYSTEM

[75] Inventor: Kenneth A. Hair, Valencia, Calif.

[73] Assignee: HR Textron Inc., Valencia, Calif.

[21] Appl. No.: 825,209

[22] Filed: Jan. 24, 1992

[51] Int. Cl.⁵ .............................................. B60G 21/06
[52] U.S. Cl. ..................................... 280/703; 280/714
[58] Field of Search ............... 280/714, 707, 702, 703, 280/6.12

[56] References Cited

U.S. PATENT DOCUMENTS

| | | | |
|---|---|---|---|
| B 550,810 | 3/1976 | Unruh et al. | |
| 2,844,384 | 7/1958 | Jackson | 280/714 |
| 2,918,303 | 12/1959 | Brown | 280/714 |
| 3,589,933 | 6/1971 | Pitcher | |
| 3,653,676 | 4/1972 | Higginbotham | |
| 3,752,497 | 8/1973 | Enke et al. | |
| 3,900,042 | 8/1975 | Unruh et al. | |
| 4,568,093 | 2/1986 | Shimizu et al. | |
| 4,607,861 | 8/1986 | Eisenberg et al. | |
| 4,625,994 | 10/1986 | Tanaka et al. | |
| 4,801,155 | 1/1989 | Fukushima et al. | |
| 4,900,056 | 2/1990 | Fukushima et al. | |
| 4,911,469 | 3/1990 | Kawarasaki | |
| 4,961,595 | 10/1990 | Fukushima et al. | |
| 4,967,361 | 10/1990 | Kamimura et al. | |
| 4,973,855 | 11/1990 | Kamimura et al. | |
| 4,982,979 | 1/1991 | Akatsu et al. | |
| 5,085,458 | 2/1992 | Kii et al. | 280/707 |

Primary Examiner—Karin L. Tyson
Attorney, Agent, or Firm—Robbins, Berliner & Carson

[57] ABSTRACT

A low band width passive vehicle suspension system for utilization with land vehicles which includes a shock absorber of the cylinder-piston type suspended between each wheel of the vehicle and its chassis. The piston divides the cylinder into a pair of chambers and the chambers are interconnected with a bypass passageway within which there is mounted a variable orifice controlled by a moveable valve. Sensors are mounted on each wheel to detect movement thereof as well as acceleration roll and pitch sensors being mounted on the vehicle. Fluidic signals are developed by each of the sensors and are applied through a fluidic circuit for application to the valve structure controlling the variable orifice. By control of the orifice, the characteristics thereof are changed to in turn change the damping characteristics of each of the shock absorbing units to thereby stabilize the vehicle.

10 Claims, 2 Drawing Sheets

PASSIVE VEHICLE SUSPENSION SYSTEM

BACKGROUND OF THE INVENTION

1. Field of the Invention

This invention relates to a vehicle suspension system and more particularly to a passive vehicle suspension system which includes a shock absorber having a fluid cylinder and in which the suspension properties of the fluid cylinder change in response to wheel acceleration, pitch, roll, or other movements of the vehicle.

2. Description of the Prior Art

A typical suspension system for vehicles utilize a suspension coil and a shock absorber interposed between a vehicle body and the vehicle wheel. The suspension coil spring generally resists loads applied to maintain the vehicle body and the road wheel in a predetermined positional relationship to each other. The shock absorber is typically intended to damp or absorb vibrations transmitted between the vehicle body and the road wheel. In some instances, the suspension system may be further provided with a roll-stabilizer for suppressing vehicular rolling motion.

In the recent past, it has become popular to utilize actively controlled suspension systems to provide smoother rides and more positive handling stability for vehicles, particularly automotive vehicles. Such actively controlled suspension systems may include hydraulic circuits which sense vehicle and wheel movements and in response thereto, control the application of hydraulic fluid under pressure from a source thereof through a pressure control valve to the suspension system. The control is effected by introducing or draining the pressurized working fluid with respect to a working chamber or chambers in a portion of the suspension system. Such a control unit actively performs anti-pitching, anti-rolling, suppression of wheel bouncing and the like. Although typically such prior art control suspension systems utilize hydraulic fluid, in some instances, pressurized pneumatic fluid has also been used.

Irrespective of the fluid medium utilized when an active control suspension system is utilized, such systems contain a large number of moveable parts and typically include a pump which is driven by the vehicle engine so as to maintain the source of fluid under pressure thus degrading fuel economy and adding substantially to the cost of the vehicle. Typical of such prior art active control suspension systems for vehicles are those shown in issued U.S. Pat. Nos. 4,625,994, 4,801,155, 4,911,469, and 4,982,979.

SUMMARY OF THE INVENTION

In accordance with the principles of the present invention, there is provided a low band width passive vehicle suspension system which includes at each wheel, a double-acting cylinder-piston shock absorbing unit connected between the vehicle body and the wheel. The system also includes sensors for detecting pitching and rolling motions of the vehicle as well as movement of the wheels responsive to road disturbances; the sensors provide fluidic signals responsive thereto. Fluidic circuit means receives the fluidic signals developed by the sensors and provides a separate output signal responsive thereto for each of the wheels which output signals in turn change the characteristics of a variable orifice connected in parallel with the shock absorbing unit to thereby stabilize the vehicle.

DETAILED DESCRIPTION OF THE PREFERRED EMBODIMENT

The present invention is directed to a passive control system which is capable of sensing movements of each of the wheels on a vehicle independently and developing fluidic signals responsive to such movement. At the same time, there are sensors positioned in the vehicle to sense various other movements normally associated with a vehicle during its operation such as pitching, rolling, acceleration, or the like. Each of these sensors also develops an appropriate fluidic signal. The various fluidic signals developed as a result of the sensed movements of the vehicle are then applied, through an appropriate crossover circuit configuration, independently to each of the shock absorbers associated with each of the wheels to stabilize the ride and handling characteristics of the vehicle. As a result, the typical rolling, pitching and road bounce associated with automotive vehicles during normal operation thereof are substantially reduced and in some instances eliminated.

Figure 1:
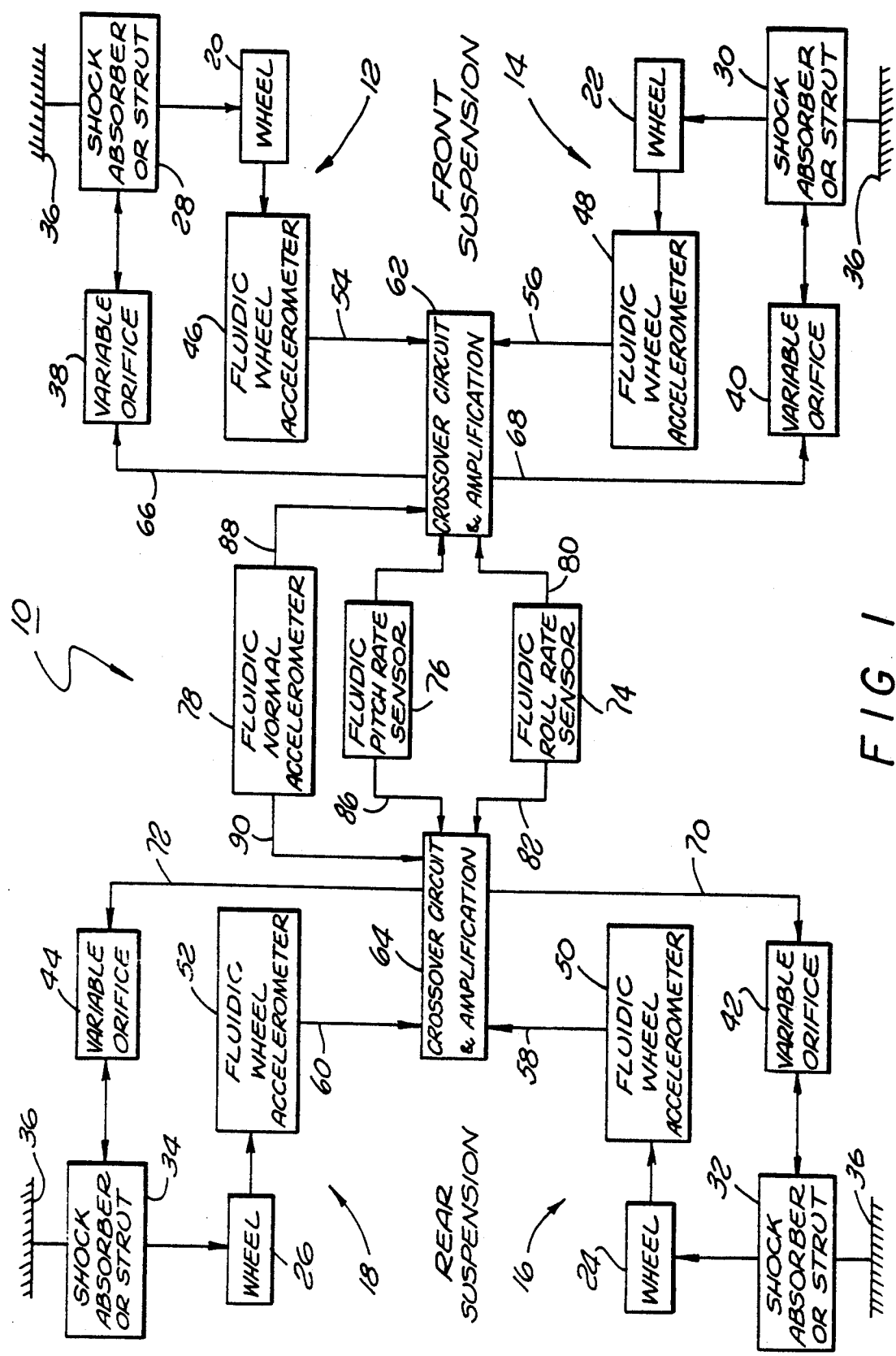
FIG. 1 is a generalized block diagram of a low-band width passive vehicle suspension system constructed in accordance with the present invention.

By reference now to FIG. 1, there is illustrated in simplified block diagram schematic form, a passive vehicle suspension system constructed in accordance with the principles of the present invention. The term passive as used throughout the specification and claims hereof is intended to mean that no fluid under pressure from a source thereof is applied to the shock absorber or strut which is utilized in the vehicle suspension system, as is the case in active control suspension systems. The only fluid under pressure which is utilized in accordance with the principles of the present invention is a very low pressure pneumatic source, such for example as air, which is applied to each of the fluidic devices utilized as component parts of the present invention.

As is shown in FIG. 1, the system 10 is directed to a wheeled vehicle and throughout the remainder of the specification, for purposes of simplicity and clarity only, the description will be with respect to an automotive vehicle utilized for the transport of passengers. As is shown in FIG. 1, the vehicle includes a front suspension and rear suspension. Each of those suspensions includes a separate and individual suspension for each of the four corners of the vehicle as illustrated at 12, 14, 16, and 18. Therefore, the term "corner" as used throughout the specification and claims, is intended to mean one quarter of the total suspension system as is utilized in an automotive vehicle having four suspension points irrespective of the number of wheels. The term "wheel" as used herein, is intended to mean the wheel or wheels utilized at each corner of the vehicle. As is shown in FIG. 1, each of the corners 12 through 18 includes a wheel 20, 22, 24 and 26, respectively.

Each of the wheels 20, 22, 24, 26 has connected thereto a shock absorber or strut 28, 30, 32 and 34 respectively. As is well known to those skilled in the art, the shock absorber or strut is mounted between the wheel 20 and the vehicle frame as shown schematically at 36. Connected in parallel with each of the shock absorbers 28, 30, 32 and 34, is a variable orifice 38, 40, 42 and 44. The shock absorber or strut typically is of the cylinder-piston type with fluid contained in chambers on each side of the piston head. The fluid, at least in part, can flow through the variable orifice in parallel with the shock absorber to allow the shock absorber to be softer or firmer. This in turn, allows the wheel 20 to move to a greater or lesser degree as controlled by the opening provided by the variable orifice in parallel with the respective shock absorber.

For the purpose of sensing wheel bounce, there is provided a fluidic wheel accelerometer 46, 48, 50 and 52 connected to each of the wheels 20, 22, 24 and 26, respectively. As a particular wheel, for example wheel 20, moves either up or down in response to a bump or a depression, respectively, in the road surface, the wheel accelerometer 46 senses such movement. In response to such movement, the accelerometer 46 develops a fluidic signal which is applied by way of the connection 54 through 60, respectively, to a crossover circuit and amplification. Such crossover circuit and amplification 62 is provided for the front suspension including corners 12 and 14 while a crossover circuit and amplification 64 is provided for the rear suspension including corners 16 and 18.

Typically, if the wheel 20 were to move as above described, the accelerometer 46 would develop an appropriate fluidic signal which is applied for amplification through the crossover circuit and amplification 62 and then by way of the connection 66 to the variable orifice 38. Typically, the variable orifice 38 would, in response to a signal from the fluidic wheel accelerometer 46, open permitting the wheel 20 to move with little or no resistance by way of allowing the piston within the shock absorber 28 to quickly move within its cylinder. As a result thereof, the vehicle frame 36 would remain substantially stable while the wheel 20 moves. Each of the wheels at each of the four corners 12 through 18 would function in the same manner. That is, the signals developed from the individual accelerometers 46 through 52 would provide signals which are uniquely adapted to control the variable orifices 38 through 44, respectively, associated therewith thus allowing the wheels 20 through 26 respectively, to independently move responsive to road conditions while allowing the vehicle frame 36 to remain substantially stable.

Located substantially centrally of the vehicle is a fluidic roll rate sensor 74, a fluidic pitch rate sensor 76, and a fluidic normal accelerometer 78. One or more of these sensors may be eliminated depending upon the particular vehicle and the applications to which it is being put.

The fluidic roll rate sensor 74 is adapted to sense the rolling motions of the vehicle, for example, those which occur as the vehicle turns. As is well known to any driver, the more severe a turn is, the more the vehicle tends to roll away from the direction of the turn. In some instances, the turn can become so severe that the roll forces will cause the vehicle wheels to skid or leave the surface of the road resulting in an accident. The fluidic roll rate sensor 74 senses these rolling forces and generates a fluidic signal in response thereto. The roll rate sensor 74 signals are applied by way of the connections 80 and 82 to the crossover circuit and amplification 62 for the front suspension and 64 for the rear suspension. These signals then develop an output signal which is applied to the appropriate variable orifices 38 through 44 depending upon the direction and severity of the roll forces. For example, if the vehicle is being turned toward the right, the crossover circuit and amplification 62 and 64 would provide signals by way of the connections 66 and 72 to the variable orifices 38 and 44, respectively, to close them and thus make the shock absorbers 28 and 34, respectively, firmer thus negating the tendency of the vehicle to roll toward the left. At the same time, signals would be applied over the connections 68 and 70 to the variable orifices 40 and 42, respectively, to open the variable orifices thus making the shock absorbers 30 and 32 less stiff.

The fluidic pitch rate sensor 76 would develop output signals which are applied over the connections 84 and 86 to the crossover circuit and amplifications 62 and 64, respectively. These fluidic signals are those developed as a result of the sudden pitching of the automobile either down or up responsive to sudden application of the brakes, depression of the accelerator pedal, a dip in the road, or the like. As with the roll rate sensor, the fluidic signals applied from the sensor 76 over the connections 84 and 86, would then be applied through the crossover circuit and amplifications 62 and 64 to the appropriate variable orifices 38 through 44 depending upon the pitching motion that has been sensed. For example, if the brakes of the vehicle are suddenly applied, the front of the vehicle would tend to dip quite severely. As a result of such pitching motion, a signal is applied from the sensor 76 over the connection 84 and through the crossover and amplification 62 by way of the connection 66 to the variable orifice 38 to close the same thus making the shock absorber 28 more firm. At the same time, a similar signal is applied over the connection 68 to the variable orifice 40 to close it and also make the shock absorber 30 more firm. Thus, the tendency of the automobile to pitch forward would be reduced or eliminated.

The fluidic normal accelerometer 78 is designed to sense the acceleration of the vehicle when the vehicle experiences body heave such as the motion associated with cresting a hill or driving over rolling countryside. Under either of these circumstances, a fluidic signal is developed and applied over the connections 88 and 90 to the respective crossover circuit and amplifications 62 and 64 which in turn apply signals to the variable orifices 38 through 44 depending upon the acceleration forces detected by the accelerometer sensor 78. For example, under body heave motions, there is a tendency for both the front and the rear of the vehicle to dip and for the front to tend to rise in response thereto. Under these circumstances, the fluidic normal accelerometer 78 signals are applied to both the front and rear suspension crossover circuit and amplifications 62 and 64 which, in turn, applies signals to the front suspension and rear suspension variable orifices 38, 40–42, 44, respectively, to cause the shock absorbers 28 through 34 to become more firm thus eliminating the acceleration sensations.

Figure 2:
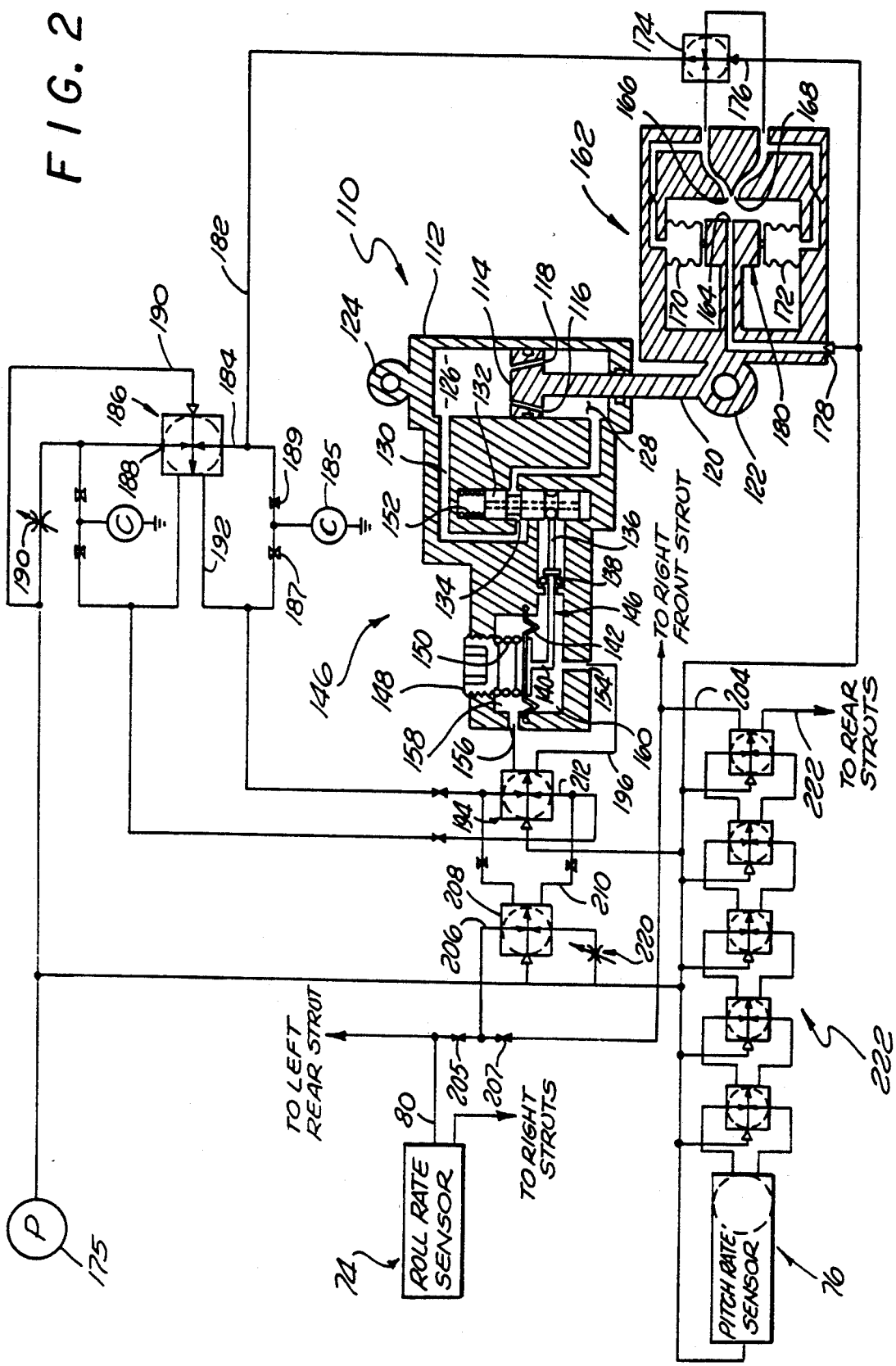
FIG. 2 is a schematic diagram partly in cross section of one corner of the system as illustrated in FIG. 1.

Referring now more specifically to FIG. 2, there is shown one implementation for a single corner of a vehicle passive suspension system of the type illustrated in FIG. 1 and above-described. It should be understood that there are different types of components which may be utilized to implement the system of the present invention. That shown in FIG. 2 is the presently preferred embodiment for such a construction. Illustrated throughout FIG. 2 are fluidic amplifiers. It is to be understood that such fluidic amplifiers are state of the art, commercially available fluidic devices well known to those skilled in the art.

The configuration shown in FIG. 2 in the cross sectional schematic configuration, is for the left front corner 12 of the system 10 as illustrated in FIG. 1. The remainder of the circuit as shown in FIG. 2 is associated with the cross over circuit and amplification 62 and the roll rate sensor and pitch rate sensor 74 and 76.

As is therein shown, a typical strut 110 includes a cylinder 112 having a piston 114 slideably disposed therein with appropriate bypass orifices 116 and 118 therethrough. A piston rod 120 extends outwardly from the cylinder 112 and includes at one end 122 thereof a wheel mount. At the opposite end of the cylinder 112, there is provided at 124 a body mount. The wheel mount and body mount serves to support the suspension system or strut 110 between the vehicle body 36 and the wheel 20 (FIG. 1).

Connected in parallel or by way of bypass, around the chambers 126 and 128 in the cylinder 112, is a passageway 130 which is interrupted by a flow control valve 132. As will be evident to those skilled in the art, when the flow control valve 132 is in the position as shown in the drawing, the piston 114 may freely slide within the cylinder 112 and the hydraulic fluid which is contained within the chambers 126 and 128 will freely pass through the passageway 130 between those chambers. If, however, the valve 132 is moved closer to the orifice 134, then there is a restriction to the flow of fluid between the chambers 126 and 128 thereby changing the characteristics of the vehicle suspension for the corner 12. Disposed to move the spool 132 is a lever arm 136 which pivots about a pivot point 138 which also functions as a seal thus precluding passage of the hydraulic fluid in the strut 110 beyond the pivot point 138. The arm 136 is connected at a first end 140 thereof to a diaphragm 142 which is secured in place, as is illustrated, by the housing 144. The combination of the diaphragm, the arm and the spool constitute a control valve 146. The position of the arm 136 is adjusted by the null adjust 148 against the tension of the springs 150 and 152 to position the spool 132 (which may be free to float, i.e., it is not attached to the arm 136).

Fluidic signals are applied through the ports 154 and 156 to cause the diaphragm 142 to move upwardly or downwardly, respectively, as viewed in the drawing, to thereby move the spool 132 more closely to or away from the orifice or port 134 in the bypass 130. That is, if air pressure enters the port 156, it will apply fluid pressure in the chamber 158 and against the upper surface of the diaphragm 142, causing the diaphragm to move downwardly. Such movement in turn causes the arm to move in a counterclockwise direction about the pivot point 138 against the force of the spring 152 causing the spool 132 to move upwardly and closer to the orifice 134. As the spool 132 approaches the orifice 134, it tends to close it off and to thereby prevent the flow of fluid through the bypass passageway 130, thus causing the strut to become stiffer. On the other hand, if fluid enters the port 154 and then passes into the chamber 160, the diaphragm will move upwardly carrying with it the arm 136 causing it to move in a clockwise direction and allowing the spool 132 to fall away from the orifice 134 thereby allowing the fluid in the chambers 126 and 128 to freely flow through the bypass passageway 130, thus making the strut 110 much softer.

Affixed to the wheel mount 122, is a fluidic accelerometer 162 which senses the movements of the wheel and provides a fluidic output signal responsive thereto. As is shown, the accelerometer 162, includes a jet pipe type structure having an ejector jet 164 and a pair of receptor ports 166 and 168. The ejector jet 164 is mounted between a pair of bellows 170 and 172. A fluidic rectifier 174 is connected to receive fluid flow through the receptor ports 166 and 168 to be applied to the control ports of the rectifier 174. A source 175 of low pressure, pneumatic fluid is connected to the source of the rectifier 174 as shown at 176. The low pressure pneumatic source 175 is also applied to the input port 178 of the ejector jet 164.

In operation, if the wheel 20 to which the acceleration sensor 162 is connected, hits any type of road irregularity, it will move responsive thereto. Such movement causes the sensor to move up or down in response to the wheel movement. Since the ejector jet has a relatively large mass 180 associated therewith, the movement thereof will lag behind the movement of the wheel 20, thus causing a disproportionate flow of fluid between the receptor ports 166 and 168 as compared to the non-movement of the sensor. The rectifier 174 functions in such a manner that when such movement occurs, a lower pressure appears in the passageway 182 and the degree of the decreased pressure is directly proportional to the amount of acceleration sensed by the sensor 162. The output of the rectifier 174 is connected to a control port 184 of a fluidic amplifier 186. To the opposite control port 188 is connected the low pressure pneumatic source 175 which passes through an acceleration threshold adjust 190. The adjust 190 is positioned such that the movement of the wheel acceleration sensor 162 will have to exceed a predetermined amount before activation of the amplifier 186. When the pressure appearing at the control port 184 drops below the threshold appearing at the control port 188, the flow of fluid through the source 190 of the amplifier 186 will appear at the output 192 thereof. The output at 192 is applied to the fluidic amplifier 194 causing the output flow of that amplifier to appear in the output 196 thereof which is in turn applied to the port 154 thereby applying fluid under pressure from the amplifier 194 into the chamber 160 causing the arm 136 to rotate clockwise moving the spool 132 away from the orifice 134, thereby allowing the piston 114 to freely move within the cylinder 112. In this manner, the road bounce of the wheel 20 responsive to the road irregularity, is not felt by the vehicle but rather is absorbed directly by the strut 110. Such operation is effective whether the wheel is moving down or up in response to road irregularities. To insure an immediate response to any sensed wheel movement, the output signal at 192 of the amplifier 186 is integrated through the use of the accumulator 185 and the restrictors 187 and 189 and fed back to the input port 184.

If, on the other hand, the vehicle is suddenly braked as in an emergency situation, the pitch rate sensor 76 detects that movement and provides a fluidic output signal responsive thereto. The sensor is of the fluidic sensors well known in the prior art such, for example in U.S. Pat. No. 3,900,042. That signal is passed through the plurality of amplifiers 202 and appears as a higher pressure signal on the output 204 of the series of amplifiers. That signal, in turn, appears at the input port 206 of the amplifier 208 and at the output 210 thereof. The output signal at 210 is then applied to the control 212 of the amplifier 194 causing high pressure fluid to appear at the port 196. This high pressure fluid enters the chamber 158 of the control valve 146 causing the arm 136 to pivot about the pivot point 138 moving the ball 132 into contact with and to close the port 134 thereby restricting the passage of fluid between the chambers 126 and 128 through the bypass passageway 130. As a result, the left front strut is made more firm. A similar signal would also be generated and applied to the right front strut also making it more firm. The result is to preclude the front of the automobile from pitching downwardly in response to the braking.

A similar result would occur if the roll rate sensor 74 were to generate a high pressure signal appearing on the conduit 80 which would also be applied at the input port 206 of the amplifier 208 which in turn would thereby make the left front strut more firm in the same manner as just described. A similar signal would be applied to the left rear strut to make it more firm, to keep the vehicle from rolling toward the left. The sensor 74 is of the same type as the sensor 76 but mounted in a different plane to sense roll rather than pitch.

A damping adjuster 220 is provided to control the rate of damping which will be generated from the pitch and roll sensors providing an output signal which is, in turn, applied to the control valve 146 in the manner as above described.

As is indicated in FIG. 2, the output of the pitch rate sensor 76 appearing at the conduit 222, is applied to the rear struts 32 and 34 associated with the rear wheels 24 and 26 of the automobile. The rear strut's control valves would function exactly opposite from that above described in that the spool appearing in the control valve would be moved away from the orifice thereby allowing the flow of fluid to bypass between the chambers of the strut.

Similarly, there would be a separate signal from the roll rate sensor 74 which would be applied to the right struts allowing the freer movement of the right struts by allowing bypass of fluid through the bypass passageway utilized therewith. Where two or more signals may be applied to control part of a fluidic amplifier at the same time, summing resistors in the form of restrictors are utilized, for example, as restrictors 205 and 207.

There has thus been illustrated and described a low band width passive vehicle suspension system for land vehicles having front and rear wheels with a double-acting cylinder-piston shock absorbing unit connected between the vehicle body and each of the wheels. By the utilization of fluidic elements in the system, an inexpensive energy conserving suspension system is provided.

What is claimed is:

1. A low band width passive vehicle suspension system for land vehicles having front and rear wheels with a shock absorbing unit connected between the vehicle body and each wheel comprising:
    (A) a first fluidic sensor means for sensing pitching motions of said vehicle body and providing a first fluidic signal responsive thereto;
    (B) a second fluidic sensor means for sensing rolling motions of said vehicle body and providing a second fluidic signal responsive thereto;
    (C) a fluidic accelerometer means at each wheel for sensing movement of each wheel responsive to road disturbances and providing a third fluidic signal responsive thereto;
    (D) means for defining a variable orifice disposed effectively in parallel with each of said shock absorbing units;
    (E) fluidic circuit means for receiving said first, second and third fluidic signals and providing a separate output signal for each wheel; and
    (F) means for applying said separate output signal to said means for defining a variable orifice for changing said orifice characteristics to in turn change the damping characteristics of each said shock-absorbing unit to stabilize said vehicle.

2. A low band width passive vehicle suspension system as defined in claim 1 wherein said shock absorbing unit is a double-acting cylinder-piston shock absorber having first and second fluid containing chambers disposed in said cylinder and interconnected with a by-pass passageway, said variable orifice being disposed in said by-pass passageway.

3. A low band width passive vehicle suspension system as defined in claim 2 wherein each said fluidic accelerometer means includes a jet pipe acceleration sensor for providing an output signal proportional to the sensed acceleration of said wheel.

4. A low band width passive vehicle suspension system as defined in claim 1 which further includes a fluidic normal accelerometer means for sensing vehicle acceleration or deceleration and providing a fourth fluidic signal responsive thereto.

5. A low band width passive vehicle suspension system as defined in claim 4 which further includes means coupling said fourth fluidic signal to said fluidic circuit means.

6. A low band width passive vehicle suspension system as defined in claim 1 wherein said fluidic circuit means includes a first fluidic circuit for supplying output signals to said front wheels and a second fluidic circuit for supplying output signals to said rear wheels.

7. A low band width passive vehicle suspension system as defined in claim 6 wherein said first fluidic circuit receives said first and second fluidic signals and said third fluidic signals only from said front wheel accelerometer means while said second fluidic circuit receives said first and second fluidic signals and said third fluidic signals only from said rear wheel accelerometer means.

8. A low band width passive vehicle suspension system for land vehicles having front and rear wheels with a shock absorbing unit connected between the vehicle body and each wheel comprising:
    (A) a first fluidic sensor means for sensing pitching motions of said vehicle body and providing a first fluidic signal responsive thereto;
    (B) a second fluidic sensor means for sensing rolling motions of said vehicle body and providing a second fluidic signal responsive thereto;
    (C) a fluidic accelerometer means at each wheel for sensing movement of each wheel responsive to road disturbances and providing a third fluidic signal responsive thereto each said fluidic accelerometer means including a jet pipe acceleration sensor for providing an output signal proportional to the sensed acceleration of said wheel and a first fluidic amplifier means having first and second control ports and an output port means coupling said output signal from said jet pipe to said first control port of said first fluidic amplifier means as a control signal to generate an output signal therefrom responsive to said sensed acceleration of said wheel;
    (D) said shock absorbing unit includes a double-acting cylinder-piston shock absorber having first and second fluid containing chambers disposed in said cylinder and interconnected with a by-pass passageway (E) means for defining a variable orifice disposed in each of said by-pass passageways;

(F) fluidic circuit means for receiving said first, second and third fluidic signals and providing a separate output signal for each wheel; and (G) means for applying said separate output signal to said means for defining a variable orifice for changing said orifice characteristics to in turn change the damping characteristics of each said shock-absorbing unit to stabilize said vehicle.

9. A low band width passive vehicle suspension system as defined in claim 8 which further includes means coupling said output port to said first control port for applying a negative feedback signal to said first fluidic amplifier.

10. A low band width passive vehicle suspension system as defined in claim 9 wherein said feed back coupling means includes means for applying a maximum signal from said first amplifier to said fluidic circuit means followed by a signal proportional to said sensed acceleration.

* * * * *